(12) United States Patent
Abe

(10) Patent No.: US 7,661,971 B1
(45) Date of Patent: Feb. 16, 2010

(54) CARD CONNECTOR

(75) Inventor: Kiyoshi Abe, Cupertino, CA (US)

(73) Assignee: Yamaichi Electronics USA, Inc., San Jose, CA (US)

( * ) Notice: Subject to any disclaimer, the term of this patent is extended or adjusted under 35 U.S.C. 154(b) by 0 days.

(21) Appl. No.: 12/182,995

(22) Filed: Jul. 30, 2008

(51) Int. Cl.
*H01R 13/62* (2006.01)

(52) U.S. Cl. ...................................... 439/159; 439/946

(58) Field of Classification Search ................ 439/159, 439/160, 345, 630, 946
See application file for complete search history.

(56) References Cited

U.S. PATENT DOCUMENTS

| | | | | |
|---|---|---|---|---|
| 6,129,572 | A * | 10/2000 | Feldman et al. | 439/328 |
| 6,231,360 | B1 * | 5/2001 | Horie | 439/159 |
| 6,846,192 | B2 * | 1/2005 | Tien | 439/159 |
| 7,172,430 | B2 * | 2/2007 | Kojima | 439/64 |
| 7,367,828 | B2 * | 5/2008 | Matsukawa et al. | 439/160 |
| 7,467,959 | B2 * | 12/2008 | Matsukawa et al. | 439/159 |
| 2004/0092146 | A1 * | 5/2004 | Tien | 439/159 |
| 2007/0037424 | A1 * | 2/2007 | Matsukawa et al. | 439/159 |
| 2007/0155210 | A1 * | 7/2007 | Matsukama et al. | 439/159 |
| 2007/0243736 | A1 * | 10/2007 | Maruyama | 439/159 |
| 2007/0249201 | A1 * | 10/2007 | Cheng et al. | 439/159 |
| 2008/0160805 | A1 * | 7/2008 | Ezaki | 439/152 |
| 2009/0075507 | A1 * | 3/2009 | Chikashige et al. | 439/159 |

* cited by examiner

*Primary Examiner*—James Harvey
(74) *Attorney, Agent, or Firm*—Squire, Sanders & Dempsey, L.L.P.

(57) ABSTRACT

A card connector has a housing, a sliding member that is designed to receive a card, and a latching member that is connected to the housing. The sliding member is slidable relative to the housing. The latching member is designed to engage the card to prevent the card from being removed from the housing.

14 Claims, 7 Drawing Sheets

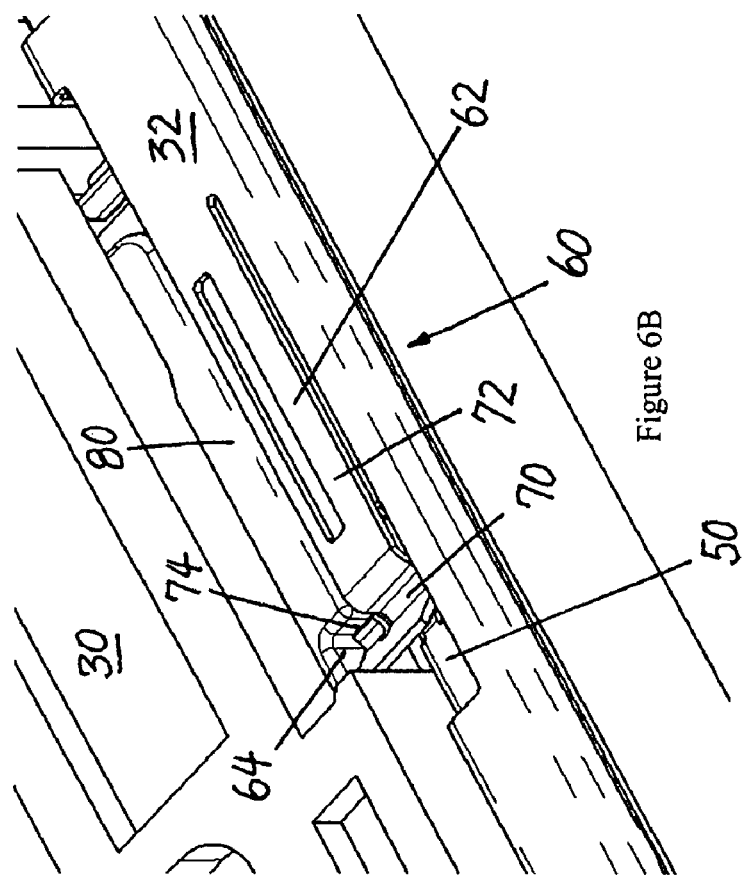
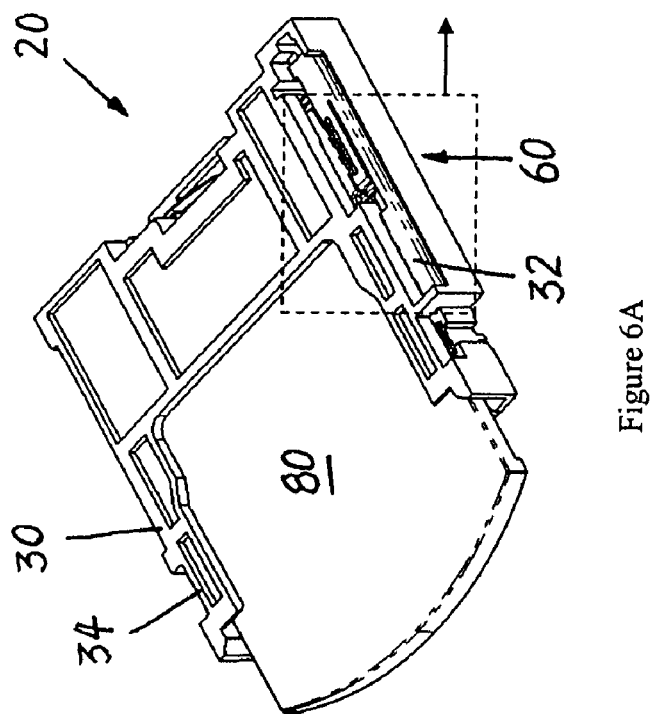
Figure 6A
Figure 6B

CARD CONNECTOR

FIELD OF THE INVENTION

The present invention relates to a card connector, in particular to a memory card connector.

BACKGROUND OF THE INVENTION

Memory cards for storing data are used in many electronic devices, such as video cameras, digital still cameras, smartphones, PDA's, music players, ATMs, cable television decoders, toys, games, PC adapters, multi-media cards and other electronic applications. A card reader, which typically is part of an electronic device, is used to read data from a memory card and transmit the data to the electronic device. And a card reader may also be used to write data from the electronic device to the memory card. A card connector is used to connect a memory card to a card reader.

There are a variety of card connectors. A common type of card connector is the push-push type, in which a memory card is first pushed into the cavity of the card connector to a latched operative position and is pushed again to be ejected and released from the latched position.

U.S. Pat. No. 7,367,828 ('828 patent), incorporated herein by reference, describes a typical memory card connector of the push-push type. As illustrated in FIGS. 1, 2 and 5-10 of this patent, a memory card connector 26 includes a dielectric housing 28 and a sheet metal shell 30. The housing 28 and metal shell 30 together define a cavity 32 for receiving a memory card 36 (FIG. 5). The cavity 32 has a front insertion opening 34 for a memory card to be inserted into and removed from the cavity 32. Referring to FIGS. 3 and 4, the rear section 28a of the housing 28 has through passages 38 for mounting a plurality of terminals 58 for connecting the memory card to a card reader.

Referring to FIG. 1 of the '828 patent, the memory card connector 26 also includes a card sliding member mechanism 60 located within the housing 28. The card sliding member mechanism 60 includes a cam slider (a sliding member) 62, a pin 64 and a coil spring 66. The coil spring 66 is mounted on a spring mounting post 48 (FIG. 3) and is sandwiched between the cam slider 62 and a rear wall portion 42b.

Referring to FIGS. 1 and 14 of the '828 patent, the cam slider 62 includes a rear, upwardly projecting body block 62a and a forwardly projecting locking arm 62b. The distal end of the locking arm 62b includes a locking projection 68, which has a gentle sloping surface 68a at the lead side of the projection and an abrupt catch surface 68b at the rear of the projection 68. The cam slider 62 also includes a heart-shaped cam slot 70 on an outside face 62c of the locking arm 62b. The heart-shaped cam slot 70 is of a conventional "push/push" configuration.

As shown in FIG. 1 of the '828 patent, a first end 64a of the pin 64 is fixed to a side wall section 28b of the housing 28. A second end 64b of the pin 64 is captured in the heart-shaped cam slot 70. Therefore, the second end 64b of the pin 64 follows the contour of the cam slot 70. The coil spring 66 constantly urges the cam slider 62 in a forward direction toward the front insertion opening 34 of the card-receiving cavity 32.

FIGS. 15-18 of the '828 patent show how the memory card 36 is inserted into the card-receiving cavity 32 through the front insertion opening 34 and placed in the latched operative position. As shown in FIG. 15, the memory card 36 is inserted into the cavity 32 in the direction of the arrow designed by "A." In FIG. 15, the memory card 36 is at a point where the memory card 36 rides along the gentle sloped surface 68a (FIG. 14) of the locking projection 68 to bias the locking projection 68 and the locking arm 62b downwardly.

FIG. 16 shows the memory card 36 being inserted further in the direction of arrow "A" until the locking projection 68 of the locking arm 62b snaps into a locking recess 36b at the edge of the memory card 36, where the contacts on the underside of the memory card 36 are in contact with the terminals 58 (FIG. 11). The memory card 36 now is locked to the cam slider 62 so that the memory card 36 and cam slider 62 move together.

FIG. 17 of the '828 patent shows the memory card 36 and cam slider 62 being pushed all the way inwardly to an "overrun" or inner limit position. At this position, the memory card 36 and cam slider 62 further compress the coil spring 66.

When pushing of the memory card 36 in the inward direction "A" is stopped, as shown in FIG. 18, the coil spring 66 pushes the memory card 36 and cam slider 62 back outwardly until the second end 64b of the pin 64 latches into a latch notch 70a (FIG. 14) of the heart-shaped cam slot 70 and the memory card 36 and cam slider 62 are stopped at the latched operative position. At this point, the contact portions 58e of the terminals 58 are still engaged with the contacts on the underside of the memory card 36.

From the latched operative position, a further push (to the "overrun" or inner limit position) and a release of the memory card 36 allow the coil spring 66 to push the memory card 36 back to the position of FIG. 16, whereupon the memory card 36 can be pulled outwardly with the locking recess 36b riding over the catch surface 68b (FIG. 14) of the locking projection 68.

Throughout this entire process, the spring arm 84 (FIGS. 2 and 7) which is stamped and formed out of a side plate 30b of the metal shell 30, is effective to bias the pin 64 into the heart-shaped cam slot 70 of the cam slider 62.

Although not described in the '828 patent, the lock of the projection 68 of the locking arm 62b with the recess 36b of the memory card 36 can be either a soft lock or a hard lock. In a soft lock, the lock of the projection 68 with the recess 36b can prevent accidental removal of the memory card 36 from its latched operative position. But it cannot prevent the memory card 36 from being forcefully pulled out from its latched operative position. In a hard lock, the lock of the projection 68 with the recess 36b can prevent the memory card 36 from being pulled out either by accident or by the application of a force.

FIGS. 1A and 1B of the present application are schematic drawings of a hard lock between a projection 68 and a recess 36b of the memory card 36. The configuration of the projection 68 prevents the memory card 36 from being removed when the projection 68 is engaged with the recess 36b.

SUMMARY OF THE INVENTION

The inventor of the present application recognizes that in a conventional memory card connector with a hard lock, a forceful removal of the memory card from the latched operative position may damage the memory card connector. At the latched operative position, as illustrated in FIG. 18 of the '828 patent, the first end 64a of the pin 64 is fixed to the side wall section 28b of the housing 28, and the second end 64b of the pin 64 latches into the latch notch 70a of the heart-shaped cam slot 70. In other words, it is the pin 64 that keeps the memory card 36 and cam slider 62 in the latched operative position, preventing the removal of the memory card 64. However, since the pin 64 is relatively fragile, a forceful pull of the memory card 36 may damage the pin 64. FIG. 2 of the present application illustrates the pin 64 when the memory card 36 is not being forcefully pulled from the latched position. FIG. 3 of the present application illustrates the pin 64 when the memory card 36 is being forcefully pulled from the latched position, causing the pin 64 to bow out, thereby damaging the pin 64.

The applicant's invention solves this problem by using a latching member connected to the housing to keep (or latch) the memory card in the latched operative position. With this arrangement a pulling force on the memory card is transmitted from the memory card to the latching member and then to the housing. In the conventional arrangement of the '828 patent, on the other hand, a pulling force on the memory card 36 is transmitted from the memory card 36 to the projection 68, then to the cam slider 62, to the pin 64, and finally to the housing 28. Since the pin 64 is used to transmit the force, it may be damaged if the force is sufficiently large.

According to one aspect of applicant's invention, a card connector includes a housing, a sliding member that is configured to receive a card, and a latching member that is connected to the housing. The latching member is configured to engage the card to prevent the card from being removed from the housing. The sliding member is slidable relative to the housing;

In a preferred embodiment, the sliding member is at least partially disposed in the housing, and the sliding member has a first position and a second position that is further inside the housing than the first position.

In another preferred embodiment, the latching member has an engaged position and a disengaged position. At the engaged position the latching member engages the card to prevent the card from being removed from the housing. At the disengaged position the latching member is disengaged from the card thus allowing the card to be removed from the housing.

In still another preferred embodiment, when the sliding member is at the second position the latching member is at the engaged position to engage the card to prevent the card from being removed from the housing, and when the sliding member is at the first position the latching member is at the disengaged position and is disengaged with the card, thus allowing the card to be removed from the housing.

In yet another preferred embodiment, the sliding member includes a notch. When the sliding member is at the first position the sliding member pushes the latching member to the disengaged position. When the sliding member is at the second position the notch of the sliding member allows the latching member to be at the engaged position.

In still yet another preferred embodiment, the card includes a notch. When the sliding member is at the second position, the latching member engages with the notch of the card to prevent the card from being removed from the card connector.

In a further preferred embodiment, the latching member and the notch of the card are configured so that when the latching member engages with the notch of the card to prevent the card from being pulled out of the housing, the engagement does not lift the latching member from the engaged position to the disengaged position.

In a still further preferred embodiment, the latching member and the notch of the sliding member are configured so that the latching member is moved from the engaged position to the disengaged position when the sliding member moves from the second position into the first position.

In a yet further preferred embodiment, the notch of the sliding member includes an incline which allows the notch to lift the latching member out of the notch of the card when the sliding member moves from the second position into the first position.

In a still yet preferred embodiment, the latching member includes a locking member and an elastic member that connects the locking member to the housing.

In another preferred embodiment, the locking member has an engaged position and a disengaged position and the elastic member biases the locking member towards the engaged position.

In still another preferred embodiment, the card includes a notch. When the sliding member is at the second position, the locking member engages with the notch of the card to prevent the card from being removed from the card connector.

In yet another preferred embodiment, the locking member and the notch of the card are configured so that when the locking member engages with the notch of the card to prevent the card from being pulled out of the housing, the engagement does not lift the locking member from the engaged position to the disengaged position.

In still yet another preferred embodiment, the locking member and the notch of the sliding member are configured so that when the sliding member moves from the second position into the first position, the locking member is moved from the engaged position to the disengaged position.

In a further preferred embodiment, the notch of the sliding member includes an incline which allows the notch to lift the locking member out of the notch of the card when the sliding member moves from the second position into the first position.

In a still further preferred embodiment, the notches are aligned along a lateral direction of the housing.

In a yet further preferred embodiment, the housing includes a side rail and the latching member is connected to the side rail.

In a still yet further preferred embodiment, the housing includes a cover and the latching member is connected to the cover.

According to another aspect of applicant's invention, a card connector includes a housing, a sliding member that is designed to receive a card, and a latching member. The sliding member is slidable relative to the housing. The latching member includes an engaged position where the latching member engages the card to prevent the card from being removed from the housing, and a disengaged position where the latching member is disengaged with the card to allow the card to be removed from the housing. The sliding member moves the latching member between the engaged position and the disengaged position.

In one preferred embodiment, the sliding member is at least partially disposed in the housing, and it has a first position and a second position that is further inside the housing than the first position.

In another preferred embodiment, when the sliding member is at the second position the latching member is at the engaged position to engage the card to prevent the card from being removed from the housing. When the sliding member is at the first position the latching member is at the disengaged position and is disengaged with the card, thus allowing the card to be removed from the housing.

In still another preferred embodiment, the sliding member includes a notch. When the sliding member is at the first position the sliding member pushes the latching member to the disengaged position. When the sliding member is at the second position the notch of the sliding member allows the latching member to be at the engaged position.

In yet another preferred embodiment, the card includes a notch. When the sliding member is at the second position, the latching member engages with the notch of the card to prevent the card from being removed from the card connector.

BRIEF DESCRIPTION OF THE DRAWINGS

FIG. 6A shows the preferred memory card connector of FIG. 4 having a memory card inserted therein.

FIG. 6B is a detailed view of the latching mechanism of the preferred memory card connector shown in FIG. 4.

DESCRIPTION OF PREFERRED EMBODIMENTS

Figure 4:
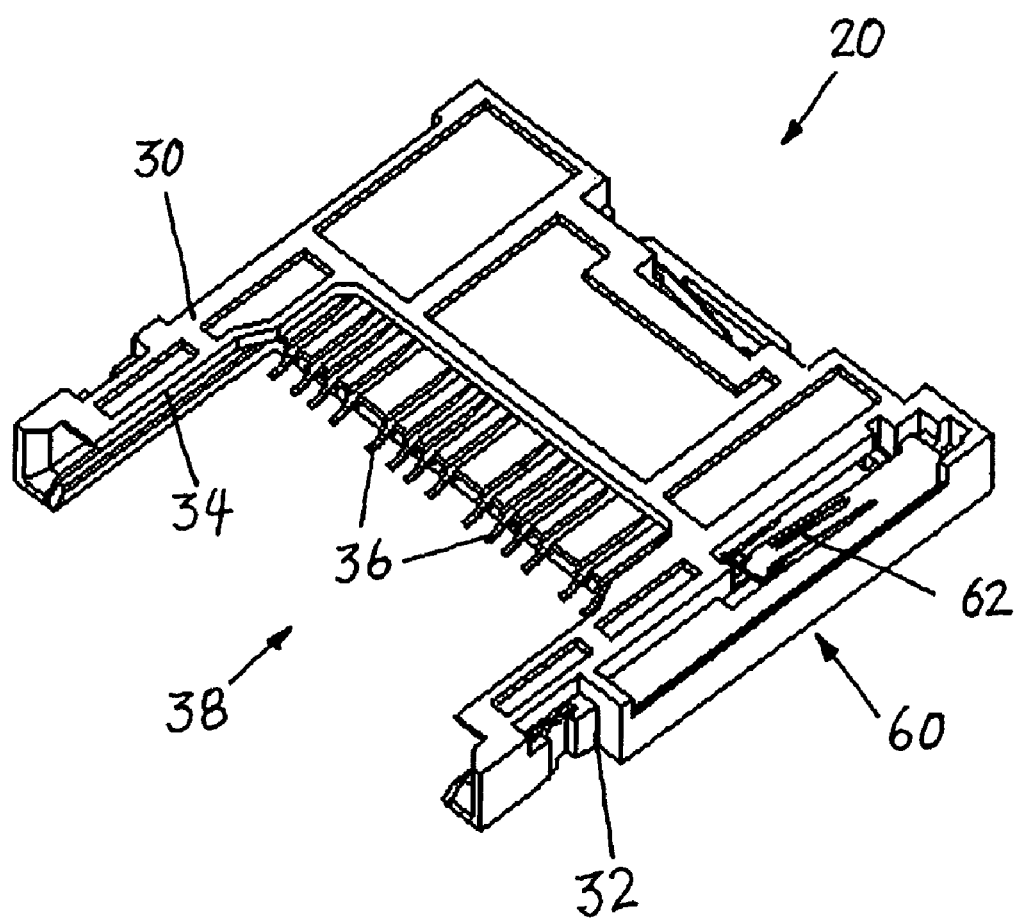
FIG. 4 shows a preferred memory card connector of the present invention.

As shown in FIG. 4, a memory card connector 20 of the present invention may include a housing 30, a sliding member 50 (which is in many respects similar to the cam slider of the '838 patent), and a locking mechanism 60. The sliding member 50 is used to receive a memory card 80 and can slide within the housing 30. The locking mechanism 60 is used to latch the memory card 80 at the operative position and to prevent the memory card 80 from being dislodged from the operative position.

The housing 30 is preferably made from a dielectric material and includes two rails 32, 34, a plurality of electric terminals 36, and an opening 38. The two rails 32, 34, arranged in parallel along the edges of the housing 30, extend in a longitudinal direction of the housing 30. One rail 32 is configured to receive a side (an edge) of the sliding member 50, thereby allowing the sliding member 50 to slide along the rail 32 (to be described in more detail below). Alternatively, both rails 32, 34 may be configured to receive two opposite sides (edges) of the sliding member 50, respectively. In the embodiment shown in FIG. 4, for example, each rail 32, 34 is hollow and has a generally rectangular cross section. The side of each rail 32, 34 facing the interior of the housing 30 is open to receive the slide member 50 and/or the memory card 80.

The terminals 36 of the housing 30 are used for electrical connection with the electric contacts of a memory card 80. The terminals 36 may be of any type that is known in the art, such as the type described in U.S. Pat. No. 7,367,838.

Figure 5:
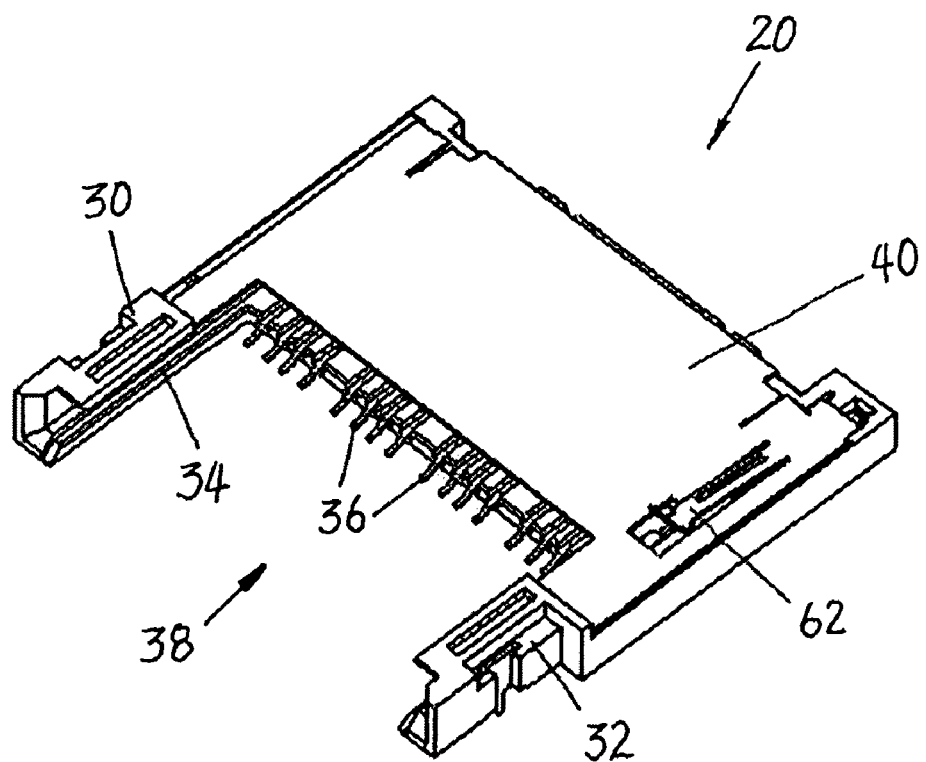
FIG. 5 shows another preferred memory card connector having a housing cover.

One or each of the side surfaces of the housing 30 may be covered with a cover. Typically, the cover is made from a metal such as sheet metal, although it can be made from any suitable material such as a plastic material. The cover may substantially shield the entire side of the housing 30, as shown in U.S. Pat. No. 7,367,838. Alternatively, as shown in FIG. 5 of the present application, the cover 40 may shield only partially the surface of the housing 30.

The opening 38 of the housing 30 allows the housing 30 to receive a memory card 80 (as shown in FIG. 6A), which can slide in and out of the housing 30 through the opening 38.

Figures 1A, 1B:
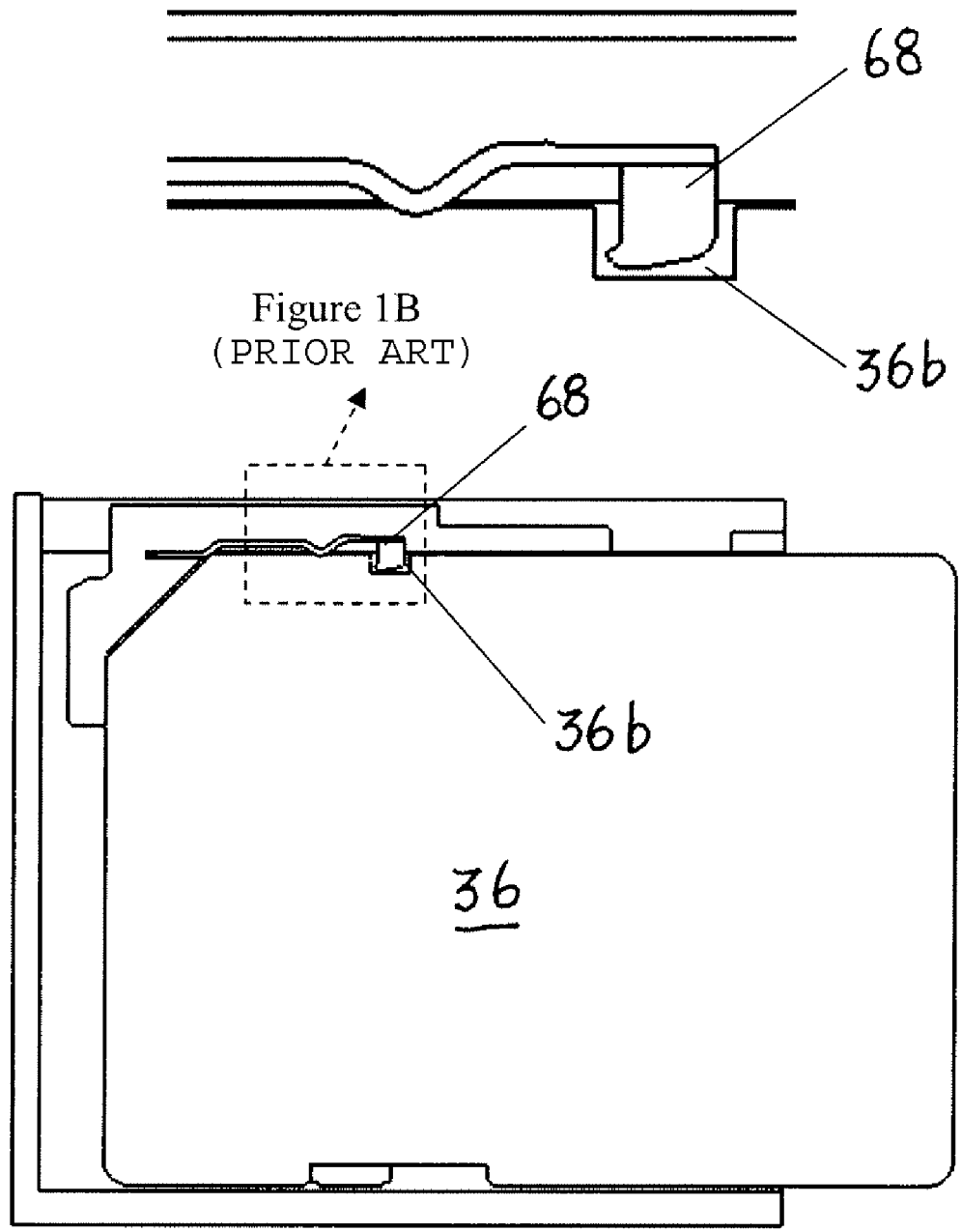
FIGS. 1A and 1B show a hard lock between the projection 68 of a locking arm and the recess of a memory card.
Figure 2:
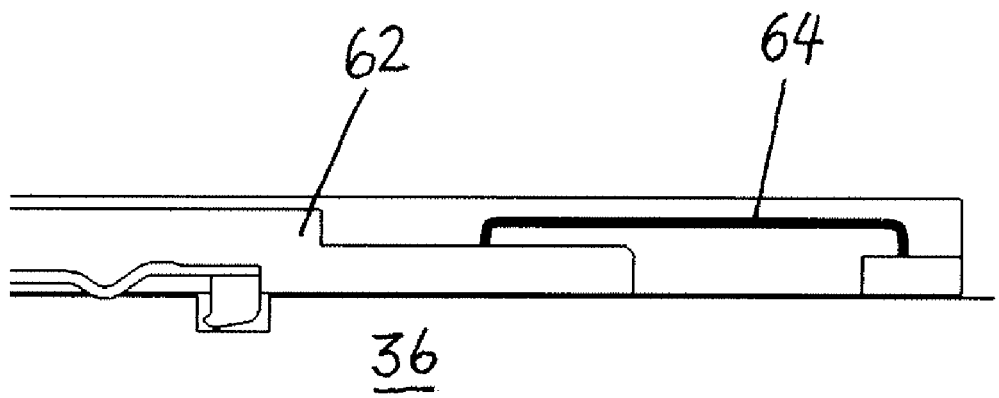
FIG. 2 shows the pin of a memory card connector when the memory card is not being forcefully pulled from the latched position.
Figure 3:
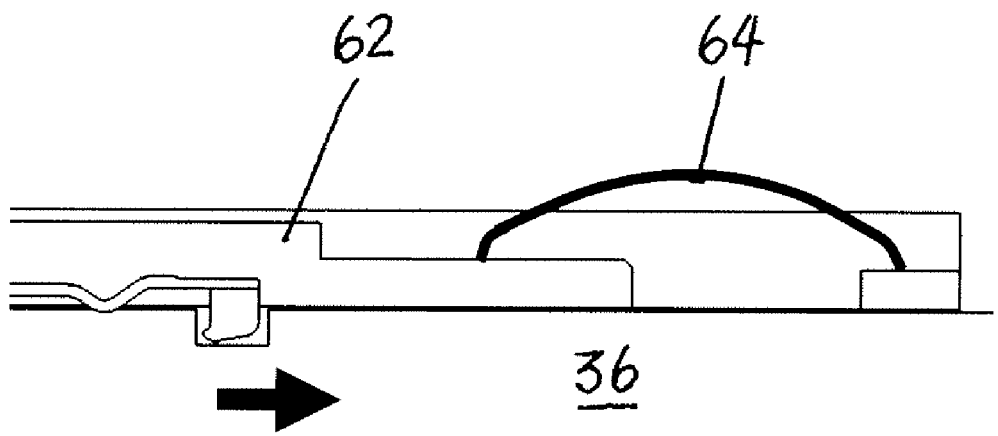
FIG. 3 shows the pin of a memory card connector when the memory card is being forcefully pulled from the latched position.
Figure 7:
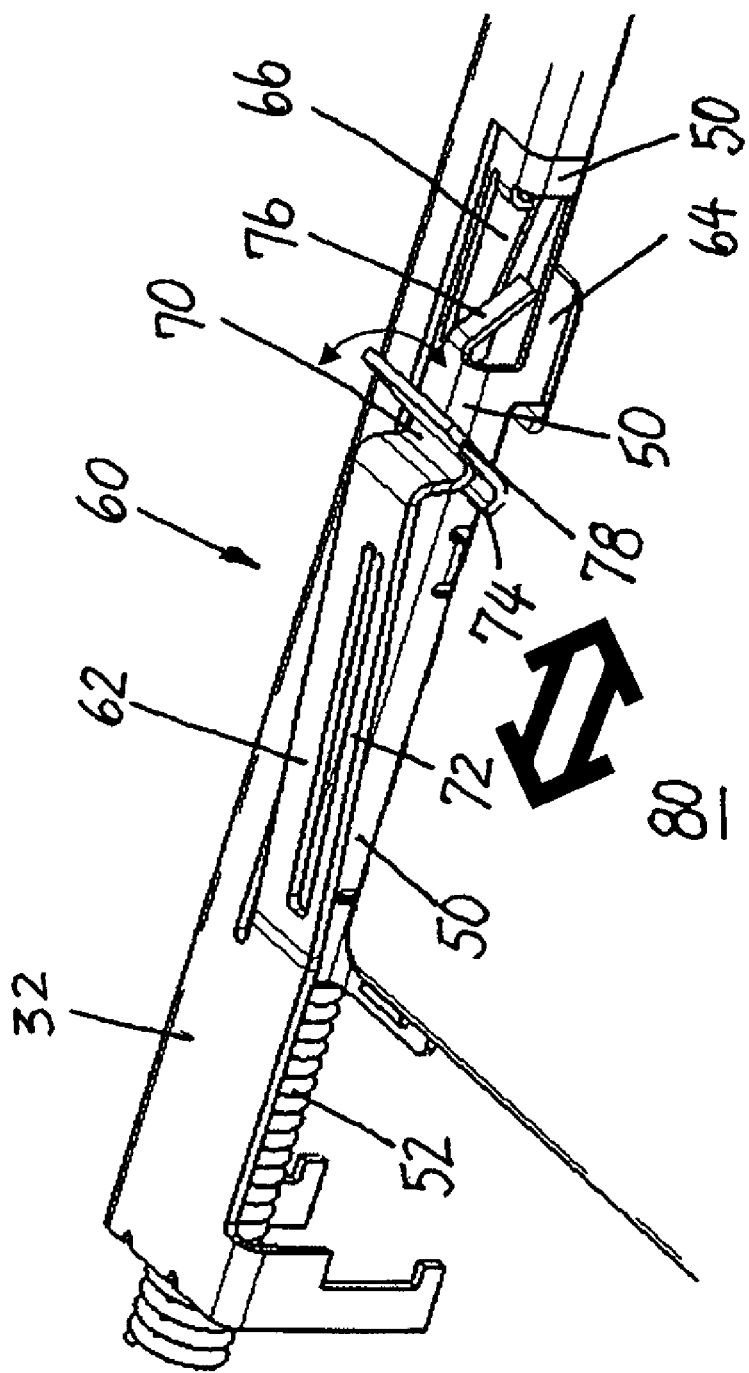
FIG. 7 shows a memory card at the released position.
Figure 8:
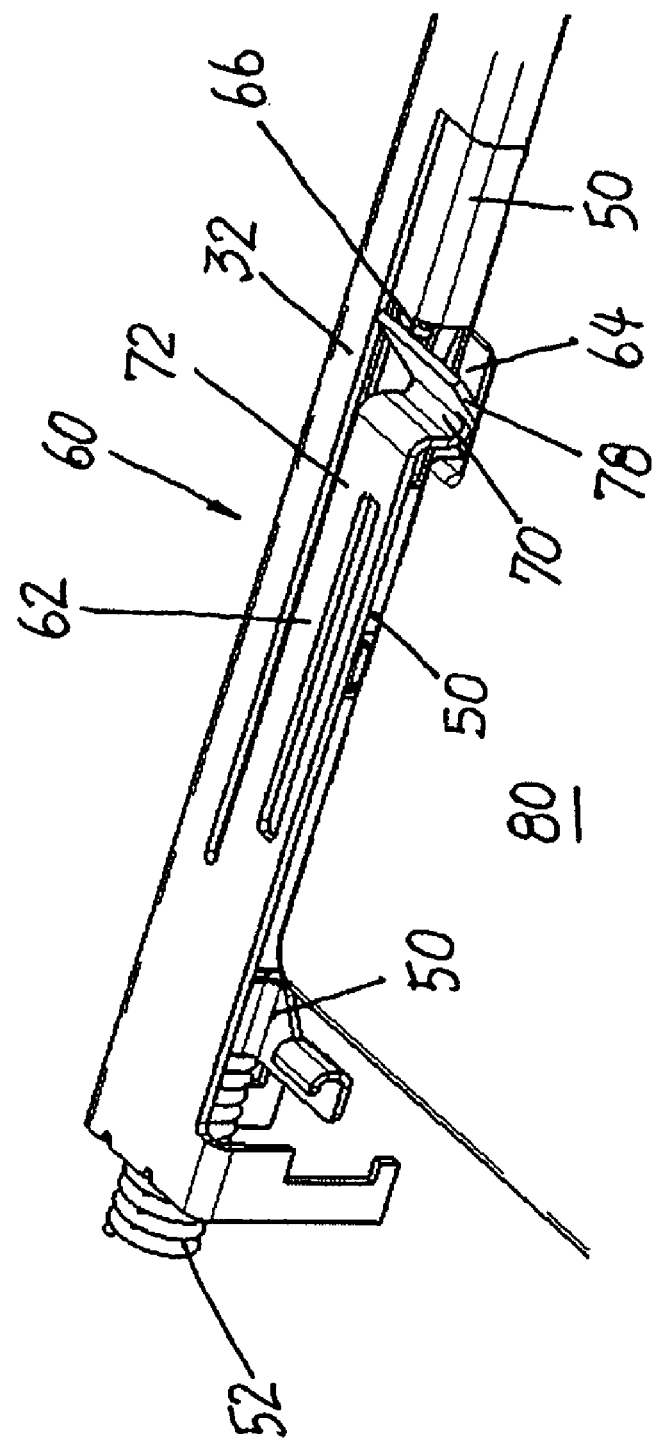
FIG. 8 shows a memory card at the latched position.

As shown in FIGS. 7 and 8, the sliding member 50 of the memory connector 20 is disposed inside the housing 30 and slidably mounted on the rail 32 of the housing 30 (see also FIGS. 1 and 2). The sliding member 50 is designed to receive the memory card 80, and allows the memory card 80 to slide into and out of the housing 30. Preferably, the sliding member 50 is made from a metal, although it can be made from any other suitable material.

The locking mechanism 60 of the memory card connector 20 is shown in each of FIGS. 4, 6A, 6B, 7, and 8. The locking mechanism 60 is used to position the memory card 80 and sliding member 50 within the housing 30. To this end, the locking mechanism 60 has structures to perform at least three functions. The first function is to position the sliding member 50 at various positions in the housing 30 as the sliding member 50 slides in the housing 30. The second function is to secure (or latch) the memory card 80 in the housing 30 when the sliding member 50 is at the latched position, and to release the memory card 80 from the memory card connector 20 when the sliding member 50 is at the released position.

The structure of the locking mechanism 60 for performing the first function may be similar in many respects to any prior art locking mechanism such as the locking mechanism described and shown in U.S. Pat. No. 7,367,838. The structure may include a heart-shaped cam slot, a pin, and a spring 52. Preferably the heart-shaped cam slot is part of the sliding member 50. As shown in FIG. 1 of U.S. Pat. No. 7,367,838, a first end of the pin is fixed to the housing 30. A second end of the pin is captured in the heart-shaped cam slot. Therefore, the second end of the pin follows the contour of the cam slot. Alternatively, the heart-shaped cam slot may be part of the housing 30. The first end of the pin is fixed to the sliding member 50, and the second end of the pin may be captured in the heart-shaped cam slot on the housing 30. The spring 52 of the memory card connector 20, compressed between the housing 30 and the sliding member 50, always biases the sliding member 50 towards the released position (i.e., pushing the sliding member 50 in a direction outwardly towards the opening 38 of the housing 30).

The structure of the locking mechanism 60 for performing the first function can position the sliding member 50 (and memory card 80) at three positions: the released position, the latched position, and the overrun position. To connect the memory card 80 to the memory card connector 20, a user places the memory card 80 in the sliding member 50, and pushes the sliding member 50 and memory card 80 from the released position further inside the housing 30, through the latched position, into the overrun position. Then the user releases the sliding member 50 and memory card 80 at the overrun position, allowing the spring 52 to push the sliding member 50 and memory card 80 from the overrun position into the latched position. At this point, the pin latches into a latch notch of the heart-shaped cam slot, thereby stopping the sliding member 50 at the latched position. At the same time, the memory card 80 is connected (or latched) to the housing 30, preventing the memory card 80 from being removed from the memory card connector 20. At the latched position, the contacts of the memory card 80 are in contact with the terminals 36 of the memory card connector 20. To release the sliding member 50 and memory card 80 from the latched position, the user pushes the sliding member 50 and memory card 80 from the latched position further inside the housing 30 into the overrun position. Then the user releases the sliding member 50 and memory card 80, allowing them to retract from the overrun position, through the latched position, and into the released position. At this position, the user can remove the memory card 80 from the memory card connector 20.

As stated above, the second function performed by the locking mechanism 60 is (1) to secure (or latch) the memory card 80 in the housing 30 when the sliding member 50 is at the latched position, and (2) to release the memory card 80 from the memory card connector 20 when the sliding member 50 is at the released position. In the embodiment shown in FIGS. 4, 6A, 6B, 7, and 8, the structure of the locking mechanism 60 for performing the second function includes a latching member 62, a notch 64 on the memory card 80 that is designed to engage the latching member 62, and a notch 66 of the sliding member 50 to engage the latching member 62 with the memory card 80 or to disengage the latching member 62 with the memory card 80. Alternatively, each of the notches 64, 66 can be replaced by any suitable structure that can perform the same functions. Preferably, as will become obvious later, the notches 64, 66 are aligned laterally.

As shown in FIGS. 4, 6A, 6B, 7, and 8, the latching member 62 of the locking mechanism 60 includes a locking member 70 and an elastic member 72 that connects the locking member 70 to the housing 30. The locking member 70 has an engaged position shown in FIG. 8 and a disengaged position shown in FIG. 7. The elastic member 72 biases the locking member 70 towards the engaged position. When the sliding member 50 and memory card 80 are at the released position, the sliding member 50 pushes the locking member 70 to the disengaged position as shown in FIG. 7. In other words, the locking member 70 rests on the sliding member 50 when the sliding member 50 and memory card 80 is at the released position. At the latched position, the locking member 70 is placed in the engaged position by the elastic member 72, resting within the longitudinally aligned notches 64, 66 of the sliding member 50 and memory card 80, as shown in FIG. 8. At this position, the locking member 70 engages with the notch 64 of the memory card 80 to prevent the memory card 80 from being removed from the memory card connector 20.

In the embodiment shown in FIGS. 4, 6A, 6B, 7, and 8, the latching member 62 is connected to the housing's rail 32. Preferably, the latching member 62 and the rail 32 are formed or stamped from the same piece of sheet metal. Alternatively, the latching member 62 can be attached to the rail 32 in any suitable manner, such as soldering, welding, riveting, and gluing. In the embodiment shown in FIG. 5, the latching member 62 is connected to the housing's cover 40 in the same manner that the latching member 62 is connected to the housing rail 32.

Preferably, the engagement between the locking member 70 and the notch 64 of the memory card 80 at the latched position is a hard lock. In other words, the locking member 70 engages the notch 64 of the memory card 80 at the latched position to prevent the memory card 36 from being pulled out by force. To this end, the surface of the locking member 70, which engages the notch 64 of the memory card 80, is configured so that it does not lift the locking member 70 out of the notch 64 when the user attempts to forcefully pull the memory card 80 out of the connector 20. This prevents the memory card 80 from being removed from the memory card connector 20 when the memory card 80 is at the latched position. Preferably, this surface of the locking member 70 does not have a slope that allows the notch 64 of the memory card 80 to exert a lifting force on the locking member 70. For example, as shown in FIG. 6B, a relatively sharp edge 74 of the locking member 70 may engage of the card's notch 64 so that the notch 64 does not exert a lifting force on the locking member 70.

On the other hand, when the sliding member 50 moves from the latched or overrun position to the released position, the notch 66 of the sliding member 50 preferably lifts the locking member 70 out of the notches 64, 66 of the memory card 80 and sliding member 50, allowing the memory card 80 and sliding member 50 to move to the released position. To this end, the engagement between the locking member 70 and the notch 66 of the sliding member 50 exerts a lifting force that lifts the locking member 70 out of the notches 64, 66 of the memory card 80 and sliding member 50. In the embodiment shown in FIGS. 4, 6A, 6B, 7, and 8, the notch 66 of the sliding member 50 may have an incline 76 (a gentle slope) which allows the notch 66 to lift the locking member 70 out of the notches 64, 66 of the memory card 80 and sliding member 50 when the sliding member 50 moves from the latched or overrun position into the released position shown in FIG. 7.

When the sliding member 50 is between the latched position and the overrun position, the locking member 70 may be at either the engaged position or the disengaged position. If the notch 66 of the sliding member 50 is sufficiently long, the locking member 70 will stay inside the notch 66 and the locking member 70 will be in the engaged position. If the notch 66 of the sliding member 50 is not sufficiently long, the locking member 70 will be pushed to the disengaged position outside the notch 66 when the sliding member 50 moves from the latched position to the overrun position. In this case, the surface of the locking member 70 that engages a back side of the notch 66 may have an incline 78 (a gentle slope) that allows the notch 66 to lift the locking member 70 to the disengaged position.

In operation, a user first inserts the memory card 80 into the sliding member 50 (and the housing 30) of the memory card connector 20. Initially, the memory card 80 is at the released position as shown in FIG. 7, with the locking member 70 of the latching member 62 resting on the sliding member 50. In other words, the sliding member 50 pushes the locking member 70 to the disengaged position at the released position. At this position, the locking member 70 is not engaged with the notch 64 of the memory card 80.

As the user pushes the memory card 80 further inside the housing 30, the memory card 80 will be at the latched position as shown in FIG. 8, with the locking member 70 of the latching member 62 resting inside the notches 64, 66 of the memory card 80 and sliding member 50. However, if the user releases the memory card 80 and sliding member 50 at this time, the gentle slope 78 inside the notch 66 of the sliding member 50 will lift the locking member 70 of the latching member 62 into the disengaged position, allowing the memory card 80 and sliding member 50 to return to the released position under the spring force.

If the user pushes the memory card 80 and sliding member 50 past the latched position into the overrun position and then releases the memory card 80, the spring 52 pushes the memory card 80 and sliding member 50 back outwardly until the pin latches into the latch notch of the heart-shaped cam slot. At this position, the pin fixes the sliding member 50 at the latched position. And the locking member 70 of the latching member 62 rests inside the notches 64, 66 of the memory card 80 and sliding member 50. Since the sliding member 50 is fixed at the latched position and cannot move past the latched position, the gentle slope 78 inside the notch 66 of the sliding member 50 cannot lift the locking member 70 into the disengaged position to allow the memory card 80 and sliding member 50 to return to the released position. As a result, the locking member 70 remains inside the notch 64 of the memory card 80. If the user attempts to forcefully remove the memory card 80 from the latched position, the locking member 70 prevents the memory card 80 from being removed. And the force applied by the user is transmitted from the memory card 80 to the latching member 62 and then to the housing 30. Since the force is not transmitted through the pin, the pin cannot be damaged by the attempted forceful removal.

To remove the memory card 80 from the latched position, the user pushes the memory card 80 further inside the housing 30 into the overrun position and then releases the memory card 80. The memory card 80 and sliding member 50 retreat under the spring force through the latched position to the released position. The sliding member 50 will not stop at the latched position because the pin will not latch into the latch notch of the heart-shaped cam slot. The user then can remove the memory card 80 from the card connector 20.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

The invention claimed is:

1. A card connector comprising:
   a housing;
   a sliding member that is designed to receive a card, wherein the sliding member is slidable relative to the housing; and
   a latching member including
      an engaged position where the latching member engages the card to prevent the card from being removed from the housing, and
      a disengaged position where the latching member is disengaged with the card to allow the card to be removed from the housing,
      wherein the sliding member moves the latching member between the engaged position and the disengaged position, wherein the sliding member is at least partially disposed in the housing, wherein the sliding member has a first position and a second position that is further inside the housing than the first position, wherein when the sliding member is at the second position the latching member is at the engaged position to engage the card to prevent the card from being removed from the housing, and wherein when the sliding member is at the first position the latching member is at the disengaged position and is disengaged with the card, thus allowing the card to be removed from the housing.

2. The card connector of claim 1, wherein the sliding member includes a notch, and wherein when the sliding member is at the first position the sliding member pushes the latching member to the disengaged position, and wherein when the sliding member is at the second position the notch of the sliding member allows the latching member to be at the engaged position.

3. The card connector of claim 2, wherein the card includes a notch, and wherein when the sliding member is at the second position, the latching member engages with the notch of the card to prevent the card from being removed from the card connector.

4. A card connector comprising:
   a housing;
   a sliding member that is configured to receive a card, wherein the sliding member is slidable relative to the housing; and
   a latching member that is connected to the housing, wherein the latching member is configured to engage the card to prevent the card from being removed from the housing, wherein the sliding member is at least partially disposed in the housing, wherein the sliding member has a first position and a second position that is further inside the housing than the first position, wherein the latching member has an engaged position and a disengaged position, wherein at the engaged position the latching member engages the card to prevent the card from being removed from the housing, wherein at the disengaged position the latching member is disengaged from the card thus allowing the card to be removed from the housing, wherein when the sliding member is at the second position the latching member is at the engaged position to engage the card to prevent the card from being removed from the housing, and wherein when the sliding member is at the first position the latching member is at the disengaged position and is disengaged with the card, thus allowing the card to be removed from the housing.

5. The card connector of claim 4, wherein the sliding member includes a notch, and wherein when the sliding member is at the first position the sliding member pushes the latching member to the disengaged position, and wherein when the sliding member is at the second position the notch of the sliding member allows the latching member to be at the engaged position.

6. The card connector of claim 5, wherein the card includes a notch, and wherein when the sliding member is at the second position, the latching member engages with the notch of the card to prevent the card from being removed from the card connector.

7. The card connector of claim 6, wherein the latching member and the notch of the card are configured so that when the latching member engages with the notch of the card to prevent the card from being pulled out of the housing, the engagement does not lift the latching member from the engaged position to the disengaged position.

8. The card connector of claim 6, wherein the latching member and the notch of the sliding member are configured so that the latching member is moved from the engaged position to the disengaged position when the sliding member moves from the second position into the first position.

9. The card connector of claim 8, wherein the notch of the sliding member includes an incline which allows the notch to lift the latching member out of the notch of the card when the sliding member moves from the second position into the first position.

10. A card connector comprising:
    a housing;
    a sliding member that is configured to receive a card, wherein the sliding member is slidable relative to the housing; and
    a latching member that is connected to the housing, wherein the latching member is configured to engage the card to prevent the card from being removed from the housing, wherein the sliding member is at least partially disposed in the housing, wherein the sliding member has a first position and a second position that is further inside the housing than the first position, wherein the latching member includes a locking member and an elastic member that connects the locking member to the housing, wherein the locking member has an engaged position and a disengaged position and the elastic member biases the locking member towards the engaged position, wherein the card includes a notch, and wherein when the sliding member is at the second position, the locking member engages with the notch of the card to prevent the card from being removed from the card connector.

11. The card connector of claim 10, wherein the notches are aligned along a lateral direction of the housing.

12. The card connector of claim 10, wherein the locking member and the notch of the sliding member are configured so that when the sliding member moves from the second position into the first position, the locking member is moved from the engaged position to the disengaged position.

13. The card connector of claim 10, wherein the locking member and the notch of the card are configured so that when the locking member engages with the notch of the card to prevent the card from being pulled out of the housing, the engagement does not lift the locking member from the engaged position to the disengaged position.

14. The card connector of claim 12, wherein the notch of the sliding member includes an incline which allows the notch to lift the locking member out of the notch of the card when the sliding member moves from the second position into the first position.

* * * * *